(12) United States Patent
Katae (10) Patent No.: US 7,763,825 B2
(45) Date of Patent: Jul. 27, 2010

(54) AXLE BEAM FOR INDUSTRIAL VEHICLE, METHOD OF MANUFACTURING THE SAME AND REAR STEERING APPARATUS

(75) Inventor: Kenichi Katae, Karaiya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 198 days.

(21) Appl. No.: 12/031,205

(22) Filed: Feb. 14, 2008

(65) Prior Publication Data

US 2008/0142570 A1 Jun. 19, 2008

Related U.S. Application Data

(62) Division of application No. 10/842,745, filed on May 11, 2004, now abandoned.

(30) Foreign Application Priority Data

May 15, 2003 (JP) ............................. 2003-136916

(51) Int. Cl.
 *B23K 10/00* (2006.01)
(52) U.S. Cl. ..................... 219/121.46; 219/121.59; 301/124.1; 180/437
(58) Field of Classification Search ............ 219/121.45, 219/121.46, 121.59; 301/124.1, 124.2, 126, 301/131, 136, 137; 180/434, 437; 280/124.12, 280/93.514, 93.572
See application file for complete search history.

(56) References Cited

U.S. PATENT DOCUMENTS

| | | | |
|---|---|---|---|
| 1,873,453 A | 8/1932 | Mogford et al. |
| 1,899,347 A | 2/1933 | Mogford et al. |
| 2,073,035 A | 3/1937 | Urschel |
| 2,911,262 A | 11/1959 | Franck |
| 3,768,585 A | 10/1973 | Matteo |
| 3,804,467 A | 4/1974 | Austermann |
| 4,046,218 A | 9/1977 | Blaisdell et al. |
| 4,137,990 A | 2/1979 | Abels |

(Continued)

FOREIGN PATENT DOCUMENTS

JP 54-24833 7/1977

(Continued)

OTHER PUBLICATIONS

European Search Report dated Oct. 27, 2008 issued by European Patent Office for application No. 04011456.3-1268/1477330.

(Continued)

*Primary Examiner*—Mark H Paschall
(74) *Attorney, Agent, or Firm*—Locke Lord Bissell & Liddell, LLP (57) ABSTRACT

An axle beam for an industrial vehicle has a beam and a boss. The beam is supported on a vehicle body. The boss is provided at opposite ends of the beam for supporting a kingpin. The beam includes at a longitudinally middle thereof a portion having a closed cross-section perpendicular to a longitudinal direction of the beam and is shaped at the portion to form a space which is surrounded by a front and rear and a top and bottom of the beam. The portion is formed by welding two members or by one tube member.

4 Claims, 9 Drawing Sheets

U.S. PATENT DOCUMENTS

| | | |
|---|---|---|
| 4,161,327 A | 7/1979 | Honecker |
| 4,361,360 A | 11/1982 | Kuether |
| 4,465,292 A | 8/1984 | Fry et al. |
| 5,429,423 A | 7/1995 | Pollock et al. |
| 5,810,377 A | 9/1998 | Keeler et al. |
| 5,865,452 A | 2/1999 | Chalin |
| 5,910,377 A | 6/1999 | Tsukamoto et al. |
| 6,032,967 A | 3/2000 | Ogoniek |
| 6,122,948 A | 9/2000 | Moses |
| 6,202,781 B1 | 3/2001 | Ima |
| 6,257,679 B1 | 7/2001 | Chino et al. |
| 6,293,022 B1 | 9/2001 | Chino et al. |
| 6,412,879 B1 | 7/2002 | Ogoniek et al. |
| 6,585,331 B2 | 7/2003 | Varela |
| 6,609,649 B1 | 8/2003 | Barnholt et al. |
| 6,695,351 B2 | 2/2004 | Bell et al. |
| 6,758,535 B2 | 7/2004 | Smith |
| 6,808,189 B1 | 10/2004 | Schlosser et al. |

FOREIGN PATENT DOCUMENTS

| | | |
|---|---|---|
| JP | 2-262401 | 10/1990 |
| JP | 07-041054 A | 2/1995 |
| JP | 2000-16107 | 1/2000 |
| JP | 2001-233063 A | 8/2001 |
| WO | WO 02/076652 A1 | 10/2002 |

OTHER PUBLICATIONS

Japanese Office Action issued on Jan. 28, 2009 for the corresponding Japanese Patent Application No. 2003-136916 (No English translation provided).

US 6,079,110, 06/2000, Chino et al. (withdrawn)

AXLE BEAM FOR INDUSTRIAL VEHICLE, METHOD OF MANUFACTURING THE SAME AND REAR STEERING APPARATUS

CROSS-REFERENCE TO RELATED APPLICATIONS

This application is a divisional of U.S. patent application Ser. No. 10/842,745 filed May 11, 2004 now abandoned under 35 U.S.C. §120, which claims priority to Japanese Patent Application No. 2003-136916 filed on May 15, 2003 under 35 U.S.C. §119, the entirety of all of which are incorporated herein by reference as if fully set forth herein.

BACKGROUND OF THE INVENTION

The present invention relates to an axle beam in a wheel suspension system for an industrial vehicle and a method of manufacturing the same.

Conventionally, a rear axle beam for supporting rear wheels in an industrial vehicle such as forklift truck is pivotally connected to a vehicle frame for supporting a rear wheel for the sake of traveling stability of the vehicle and comfort of riding. For example, as disclosed in FIG. 8 of Unexamined Japanese Patent Publication No. 2000-16107, a rear axle beam (31) includes an axle beam body (34) having a first plate 32 and a pair of second plates (33a, 33b) and also includes two pairs of bosses (35a, 35b) for supporting kingpins (not shown). Each pair of the bosses (35a, 35b) is welded on each side of the axle beam body (34) in such a manner that the bosses (35a, 35b) are vertically arranged on the upper side and the lower side, respectively. The rear axle beam (31) is pivotally supported with respect to a rear frame of a vehicle body (not shown) through a pair of center pins (36) which is formed at the middle portion of the axle beam body (34) as seen in the direction of the vehicle width.

Figure 9A:
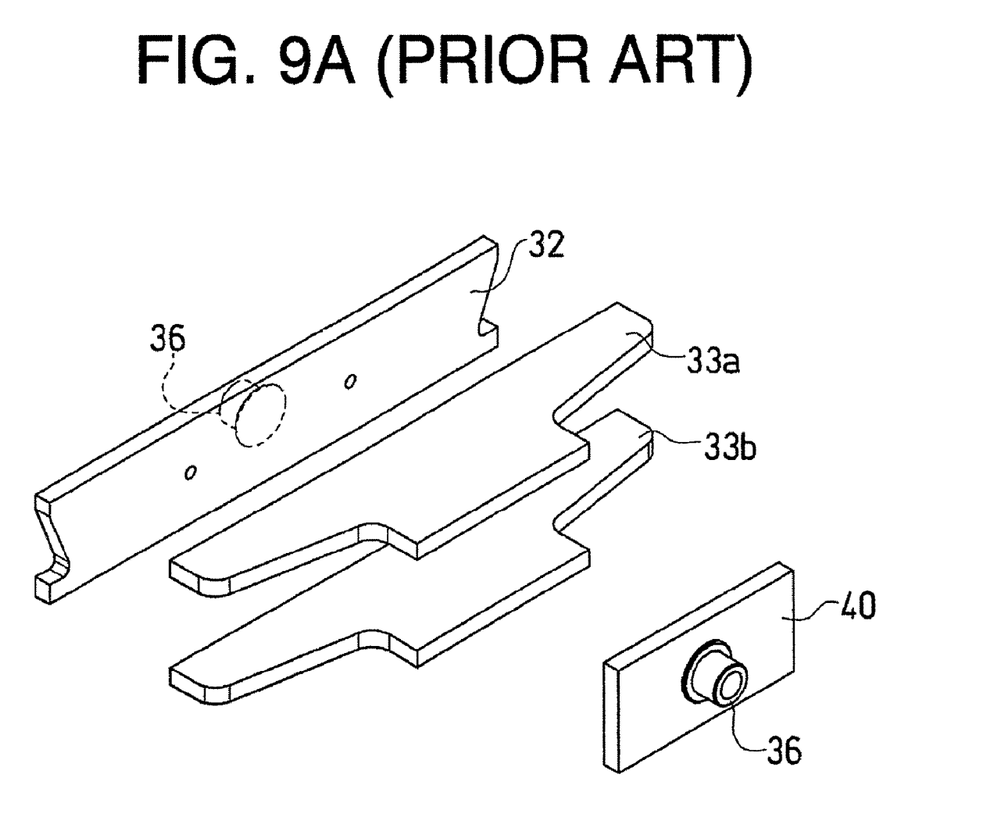
FIG. 9A is an exploded perspective view of an axle beam according to a prior art.

Referring to FIG. 8 of Unexamined Japanese Patent Publication No. 2000-16107, one of the center pins (36) is fixedly connected to the first plate (32) that interconnects a pair of the second plates (33a, 33b). Though it is not directly apparent from the above FIG. 8, in view of the arrangement that the center pins (36) are fixedly connected on both front and rear sides of the rear axle beam (31), it is assumed that the paired second plates (33a, 33b) are also interconnected by a plate member 40 on the opposite side relative to the side interconnected by the first plate (32), as shown in FIG. 9A. Then, the other center pin (36) is presumably fixedly connected to the plate member 40. It is noted that FIG. 9A is a perspective view as seen from the opposite side as shown in FIG. 8 of Unexamined Japanese Patent Publication No. 2000-16107. The bosses (35a, 35b) are not shown in FIG. 9A.

Figure 9B:
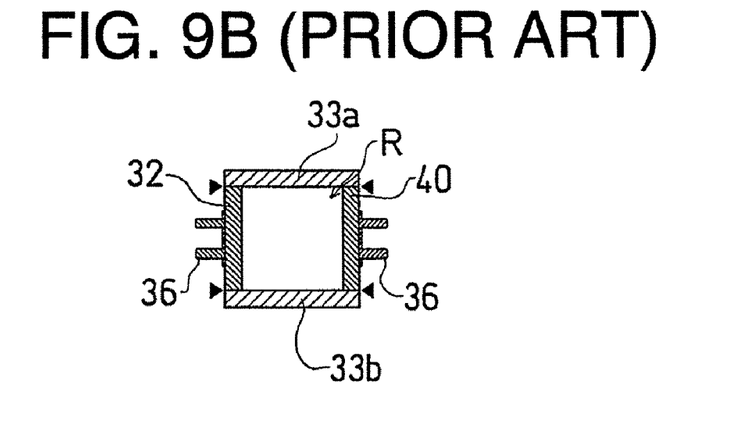
FIG. 9B is a cross-sectional view of a middle portion as seen in the longitudinal direction of the axle beam according to the prior art.

The above four plates, that is, the first plate (32), the second plates (33a, 33b) and the plate member 40, cooperate to form a space R surrounded by the front and rear and the top and bottom walls, as shown in FIG. 9B. Thus, the axle beam body (34) forms a tube having a hollow space inside. The shape of the axle beam body (34) increases the rigidity of the axle beam body (34) and ensures the strength thereof.

In the structure disclosed in Unexamined Japanese Patent Publication No. 2000-16107, however, the number of manufacturing processes undesirably increases due to the multiple number (four) of plates to be welded. As indicated by the filled triangles in FIG. 9B, there are as many as four welded portions and the strength tends to be weakened by such relatively large number (four parts) of welded portions. Additionally, it is difficult to ensure stability of strength for an axle beam having many welded portions. To compensate for the insufficient strength due to of the welded portions and to achieve the required strength, the four plates themselves need be made thicker, which only causes increased manufacturing cost.

The four plates prepared, for example, by means of gas fusing may lead to undesired dimensional accuracy and, therefore, the yield rate of material may be reduced to 60% to 70%, thereby increasing manufacturing cost. Additionally, the quality of the welded portions of the bosses (35a, 35b) fixed to the axle beam body (34) by welding tends to be lowered due to poor dimensional accuracy of each component plate of the axle beam body.

Moreover, according to the structure disclosed in Unexamined Japanese Patent Publication No. 2000-16107, since the four plates are used to form the axle beam body (34), the number of components increases, thereby increasing the trouble in controlling such components. Therefore, there is a need for providing an axle beam for an industrial vehicle which reduces the number of components and also reduces the number of manufacturing processes by reducing welded portions.

SUMMARY OF THE INVENTION

In accordance with the present invention, an axle beam for an industrial vehicle has a beam and a boss. The beam is supported on a vehicle body. The boss is provided at opposite ends of the beam for supporting a kingpin. The beam includes at a longitudinally middle thereof a portion having a closed cross-section perpendicular to a longitudinal direction of the beam and is shaped at the portion to form a space which is surrounded by a front and rear and a top and bottom of the beam. The portion is formed by welding two members or by one tube member.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

A preferred embodiment of the present invention will now be described with reference to FIGS. 1 through 3.

Figure 1:
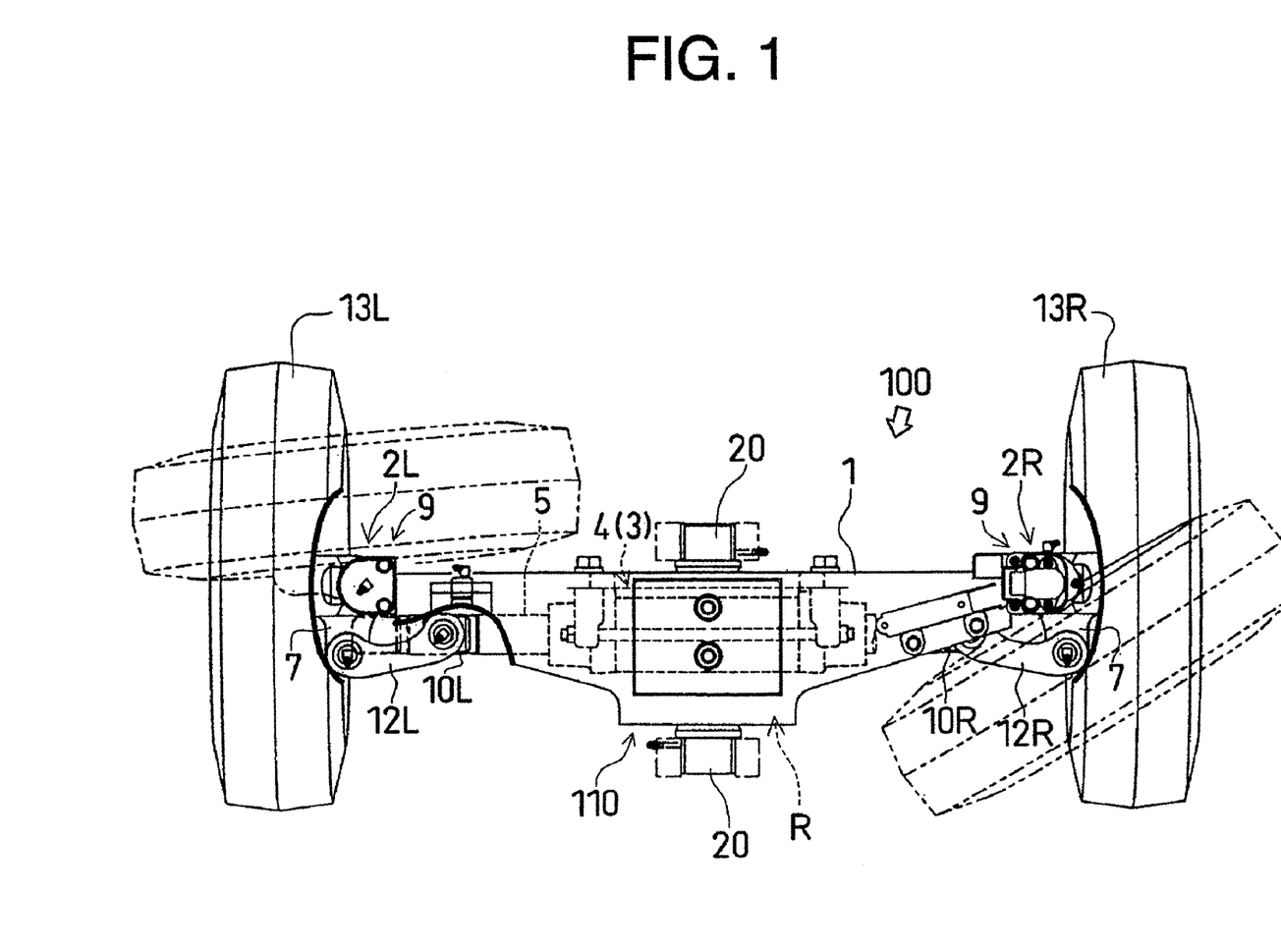
FIG. 1 is a plan view of a whole rear axle device having an axle beam according to a preferred embodiment of the present invention.

Now referring to FIG. 1, the drawing illustrates a plan view of an entire rear axle device 100 provided on the rear side of a forklift truck according to the first preferred embodiment of the present invention. The rear axle device 100 has an axle beam 110 and a pair of right and left steering knuckles 2R, 2L which are pivotally supported on opposite sides of the axle beam 110.

Figure 3:
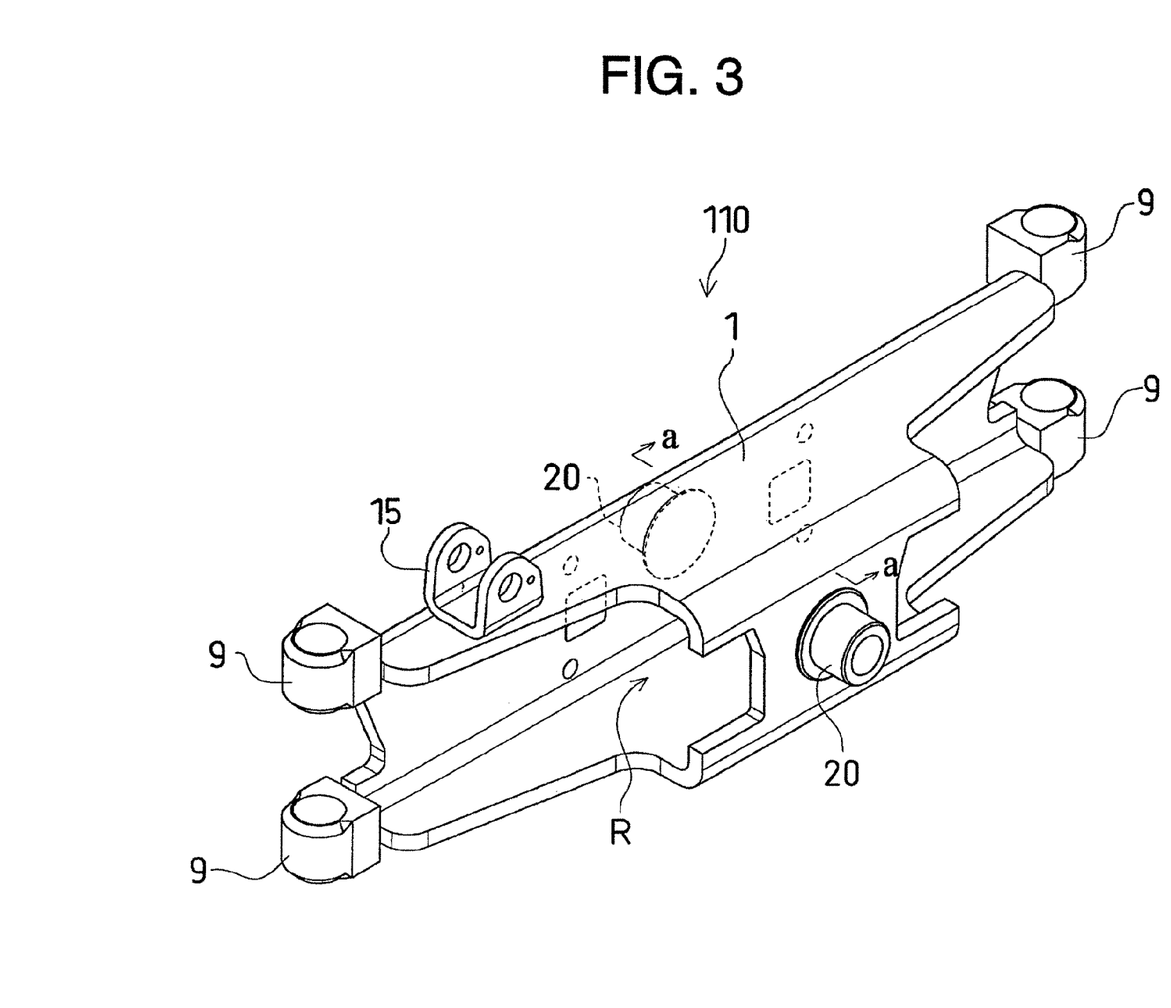
FIG. 3 is a perspective view of the axle beam according to the preferred embodiment of the present invention.

The axle beam 110 includes a beam 1 extending laterally relative to the vehicle body and two pairs of upper and lower bosses 9 provided at the opposite ends of the beam 1, as best seen in FIG. 3. The paired bosses 9 on each side are located one above the other. Center pins 20 are welded to the front and rear surfaces of the beam 1, respectively, and are located at the middle portion in the longitudinal direction (the longitudinally middle portion) of the beam 1 between the opposite ends. The axle beam 110 is pivotally supported by a rear frame (not shown) of the vehicle body through the center pins 20.

Figure 2:
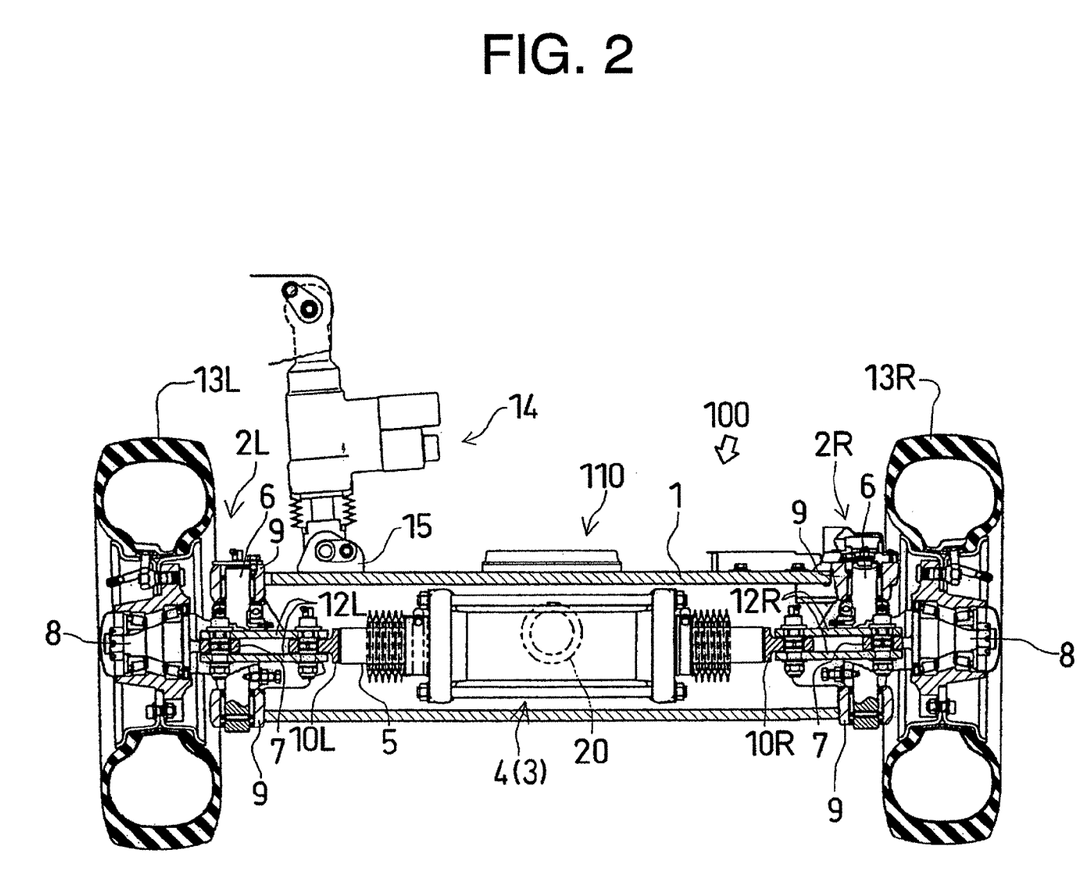
FIG. 2 is a partially cross-sectional rear end view of the rear axle device according to the preferred embodiment of the present invention.

As shown in FIG. 2, a bracket 15 is fixedly connected to the top surface of the beam 1 adjacent to one end of the beam 1 in the longitudinal direction. A damper device 14 is pivotally coupled at one end thereof to the bracket 15 and at the other end thereof to the rear frame of the vehicle body.

The paired steering knuckles 2R, 2L are shaped and provided symmetrically with respect to the middle of the axle beam 110. Referring to FIG. 2 showing a cross-sectional rear end view of the rear axle device 100, each of the steering knuckles 2R, 2L has a kingpin 6 and a wheel spindle 8. Each of the kingpins 6 extends in the vertical direction (the upper and lower direction in FIG. 2) of the vehicle body. Each of the wheel spindles 8 protrudes from its associated kingpin 6 outward in the lateral direction of the vehicle body. The kingpins 6 of the steering knuckles 2R, 2L are rotatably supported in the paired upper and lower bosses 9 disposed at the opposite ends of the axle beam 110, respectively.

The wheel spindles 8 of the steering knuckles 2R, 2L rotatably support rear wheels or steerable wheels 13R, 13L, respectively. As shown in FIGS. 1 and 2, a knuckle arm 7 extends rearward from each of the kingpins 6.

A double acting hydraulic cylinder 4 of a full hydraulic power steering device 3 is mounted on the longitudinally middle portion (the laterally middle portion in FIG. 1) of the axle beam 110. The hydraulic cylinder 4 has a cylinder rod 5 which is operable to be displaced in the lateral direction of the vehicle body.

Clevises (or connecting members) 10R, 10L are formed on the opposite ends of the cylinder rod 5, respectively. Tie rods 12R, 12L are pivotally coupled at the inner ends thereof to the devises 10R, 10L and at the outer ends thereof to the knuckle arms 7 of the steering knuckles 2R, respectively.

The structure of the full hydraulic power steering device 3, which is known in the art, is operable to displace the cylinder rod 5 in the axial direction thereof by charging and discharging oil under pressure into and out of the double acting hydraulic cylinder 4 in response to the operation of a steering wheel (not shown) provided at operator's seat. As the cylinder rod 5 is displaced in either direction, one of the tie rods 12R, 12L connected to the cylinder rod 5 through the respective devises 10R, 10L pushes one knuckle arm 7, and the other tie rod pulls the other knuckle arm 7. As a result, the steering knuckles 2R, 2L pivot to change the direction of the rear wheels 13R, 13L, so that the forklift truck is operable to turn in the steered direction.

Thus, the axle beam 110, the hydraulic cylinder 4, the devises 10R, 10L, the tie rods 12R, 12L and the steering knuckles 2R, 2L cooperate to make the rear steering device for changing the direction of the rear wheels.

Figure 4:
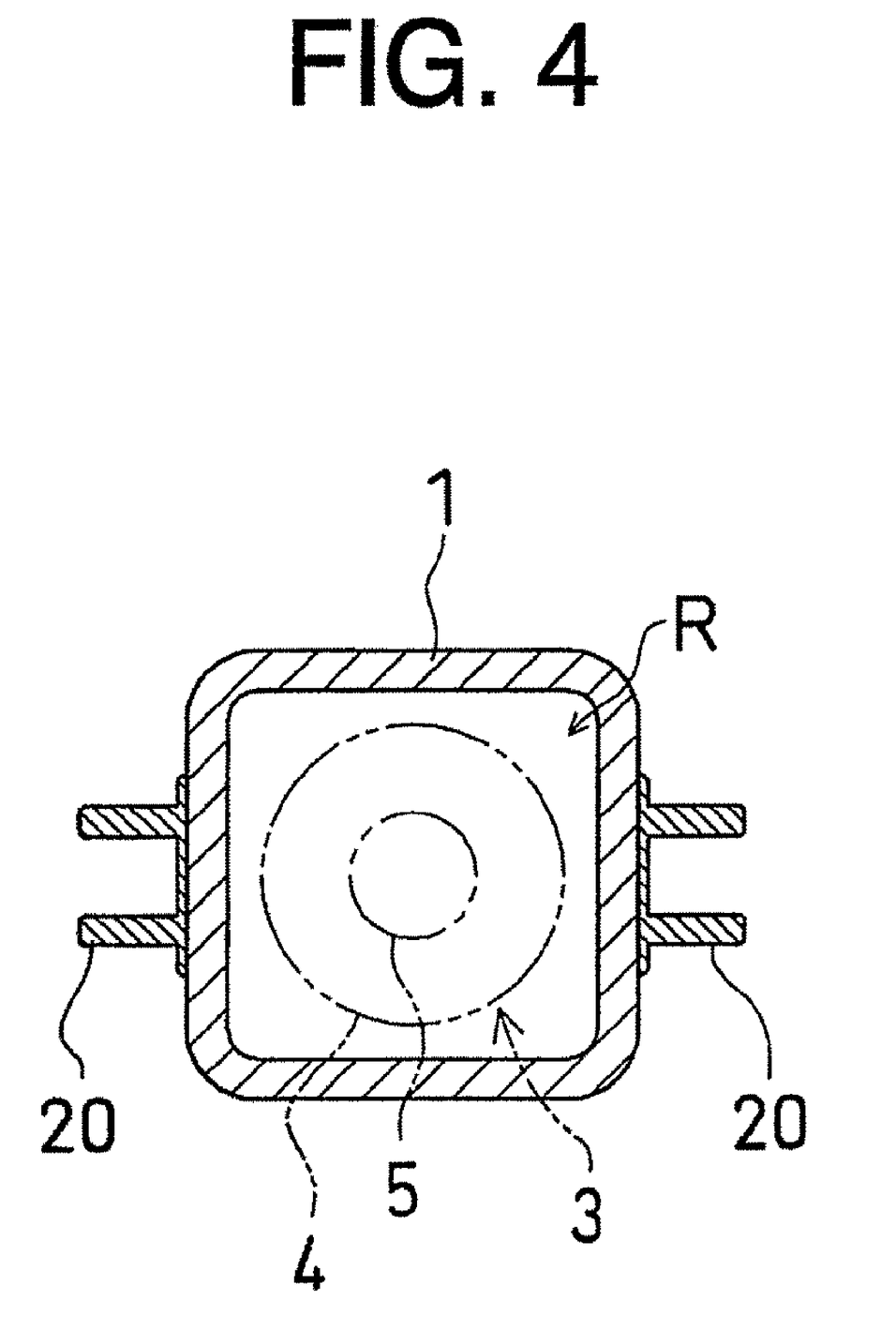
FIG. 4 is a cross-sectional view that is taken along the line I-I in FIG. 3.

Now referring to FIG. 4 showing a cross-section of the beam 1 taken perpendicularly to the longitudinal direction of the beam 1 of the axle beam 110 along the line I-I of FIG. 3, the beam 1 of the axle beam 110 forms a closed rectangular shape at the middle thereof where the center pins 20 are fixed. That is, as shown in FIG. 4, the beam 1 is shaped at its middle to form a space R which is surrounded by the front and rear and the top and bottom of the beam 1. Thus, the tube structure of the beam 1 increases the rigidity and hence ensures the strength required for the beam 1.

In the preferred embodiment, the above described hydraulic cylinder 4 is located in the space R which is surrounded by the beam 1, as shown in FIG. 4. Consequently, the front and rear and the top and bottom of the hydraulic cylinder 4 is surrounded by the beam 1, so that the hydraulic cylinder 4 is protected against breakage due to hitting from outside by a rock and the like.

Figure 5:
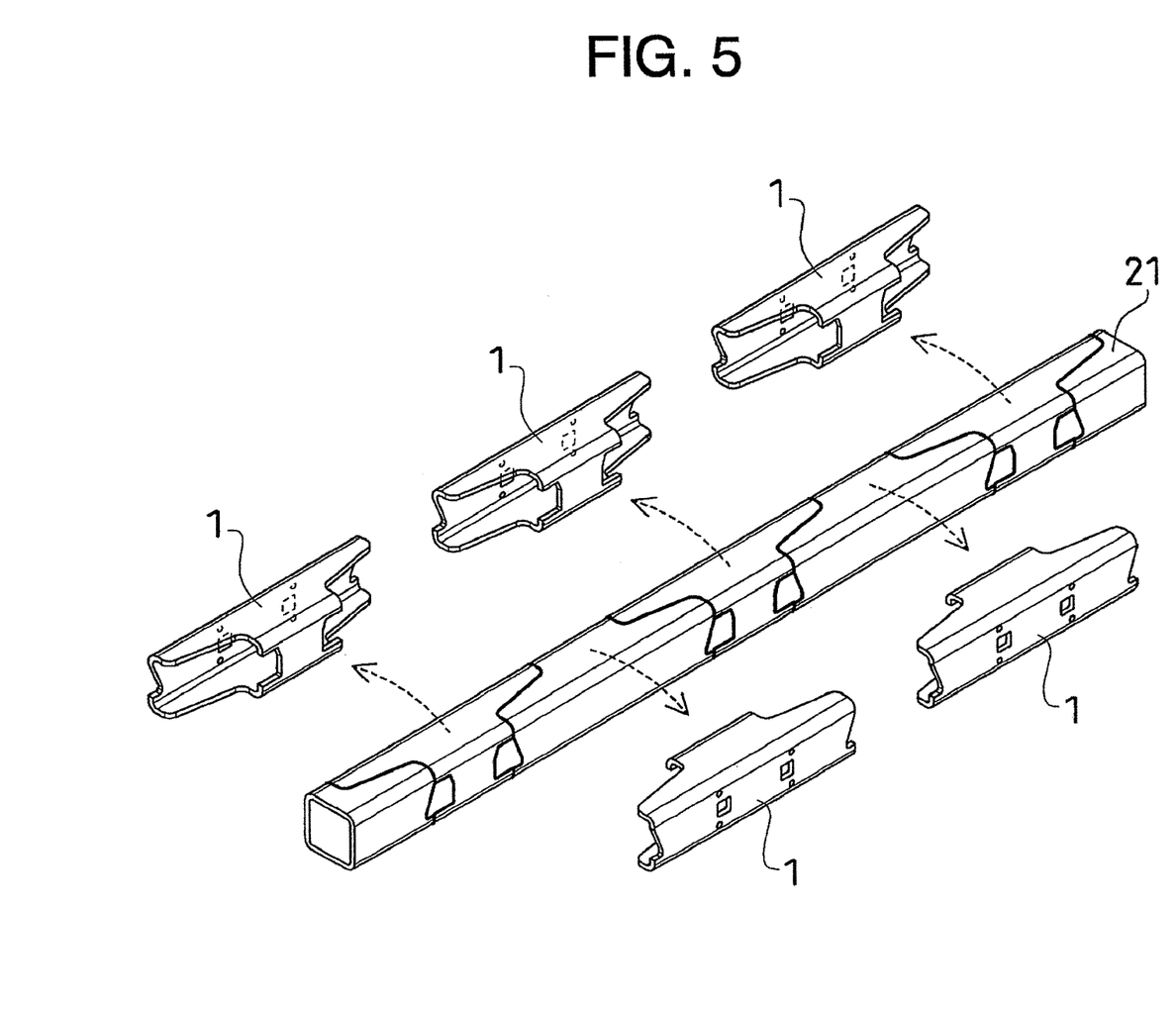
FIG. 5 is a perspective view illustrating a process for carving a beam out of a square pipe according to the preferred embodiment of the present invention.

Now referring to FIG. 5 illustrating the process of manufacturing the beam 1 of the axle beam 110, the beam 1 is made by cutting from an elongated square tube material 21 as a base material having a closed rectangular cross-section that is taken perpendicularly to the longitudinal direction of the beam 1. The square tube material 21 is cut into beams 1 by fusion using a three dimensional plasma fusing apparatus (first manufacturing process). A three dimensional laser fusing apparatus is also applicable for fusing the square tube material 21.

The square tube material or the base material 21 is made of metal and formed by extruding a bar material called billet. It is noted that the square tube material 21 may be made by bending a flat plate material and then welding the ends thereof to form a square tube. In this case, the beam 1 has one welded portion in the cross-section thereof taken perpendicularly to the longitudinal direction of the beam 1. For enhancing dimensional accuracy by reducing the number of welded portions, however, it is desirable to form a seamless tube by extrusion molding.

Thus forming a seamless tube by extrusion molding, the beam 1 can be made free of welded portion which are relatively weak in strength as shown in FIG. 4, with the result that the strength of the beam 1 is improved. In other words, even if the square tube material 21 is made relatively thin, the strength required for the beam 1 is ensured, so that material cost, as well as manufacturing cost, is reduced.

As most clearly seen in FIG. 3, the beam 1 is formed in such a way that only its middle portion between the opposite ends thereof is closed by four top, bottom, front and rear walls thereby to form the space R, while the remaining end portions are open on the rear side and taper-shaped toward the ends as seen from the top.

The tapered ends of the beam 1 allow the rear wheels 13L, 13R to be turned over a wider range, as indicated by the chain lines in FIG. 1, so that turning radius of the forklift truck is advantageously reduced. Additionally, the tapered ends help reduce the manufacturing cost and also the weight of the axle beam 110, while ensuring the strength required for the axle beam 110.

Furthermore, since the beam 1 is tapered at the opposite ends where the beam 1 is shaped thin, a plurality of identical beams 1 can be cut from a single elongated square tube material or a base material 21 with as little waste as possible by cutting along the cutting lines indicated by bold lines in FIG. 5, that is, a plurality of the identical beams 1 is in staggered arrangement on the elongated square tube material 21 for fusing. That is, the cutting lines (indicated by the bold line in FIG. 5) for fusing are determined in such a manner that the tapered ends of the coadjacent beams 1 are arranged to vertically overlap relative to the longitudinal direction of the square tube. Thus, more number of the beams 1 is manufactured from a bar of the square tube material 21, so that waste produced from the square pipe 21 is reduced.

By using the three dimensional plasma fusing apparatus (or the three dimensional laser fusing apparatus) as in the preferred embodiment, dimensional accuracy of the resulting beam 1 is much improved over that obtainable by gas fusing and the like. The improved dimensional accuracy helps increase yield rate and hence reduce the manufacturing cost.

Figure 6:
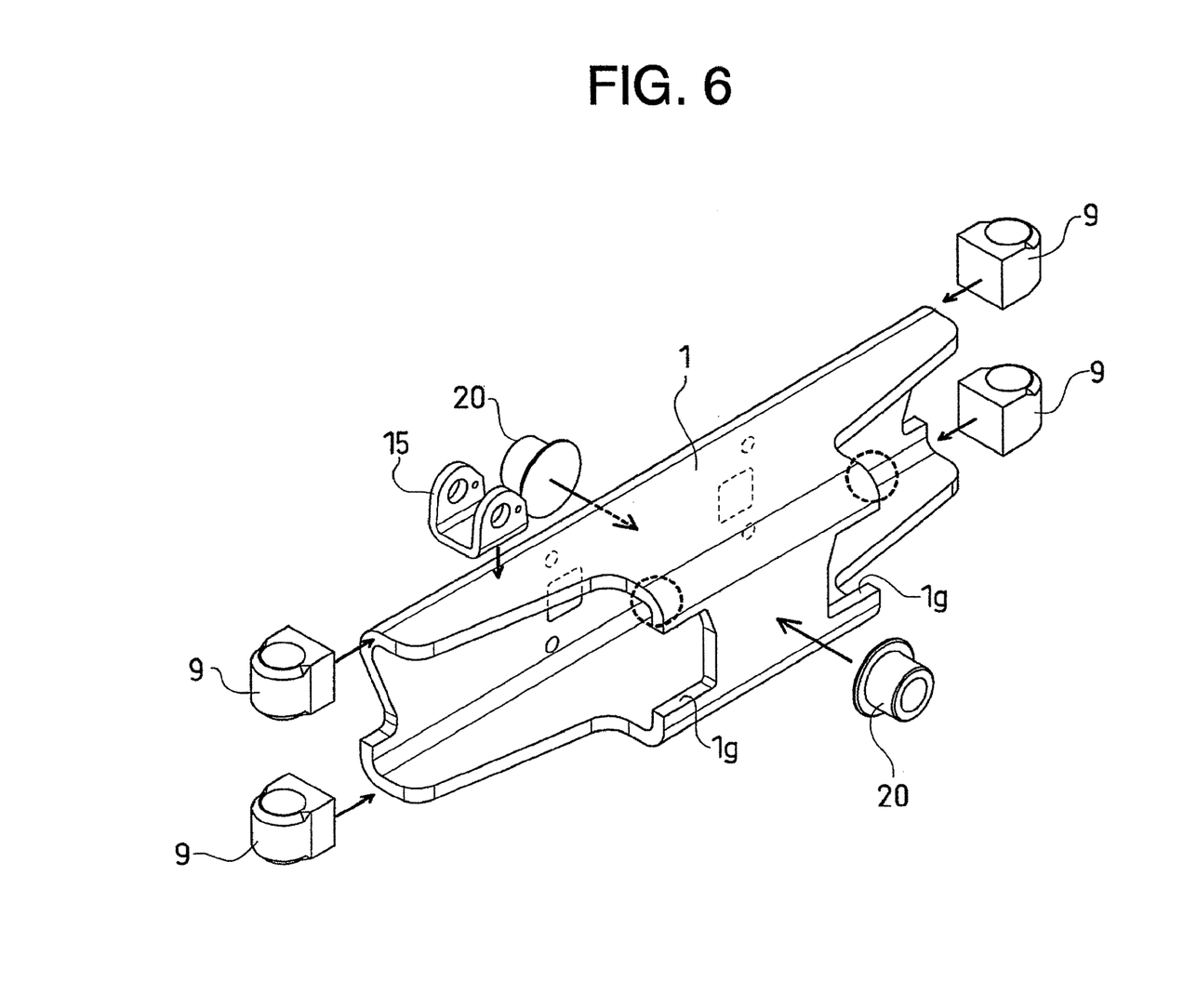
FIG. 6 is a perspective view of a process for fixedly connecting a boss and the like to the beam according to the preferred embodiment of the present invention.

Now referring to FIG. 6 illustrating the second manufacturing process, the center pins 20, the bracket 15 and the bosses 9 are welded to the cut out beam 1. Thus, the axle beam 110 shown in FIG. 3 is completed.

It is noted that, as shown in FIG. 6, cutout portions 1g are formed on opposite sides of the rear center pin 20 in such a manner that the beam 1 is recessed in the lateral direction for a predetermined length. The formation of such cutout portions 1g helps relieve the stress concentration which tends to occur during vehicle operation at positions of the beam 1 which are indicated by dotted bold circles in FIG. 6.

The present invention is not limited to the embodiments described above but may be modified into the following alternative embodiments.

Figure 7A:
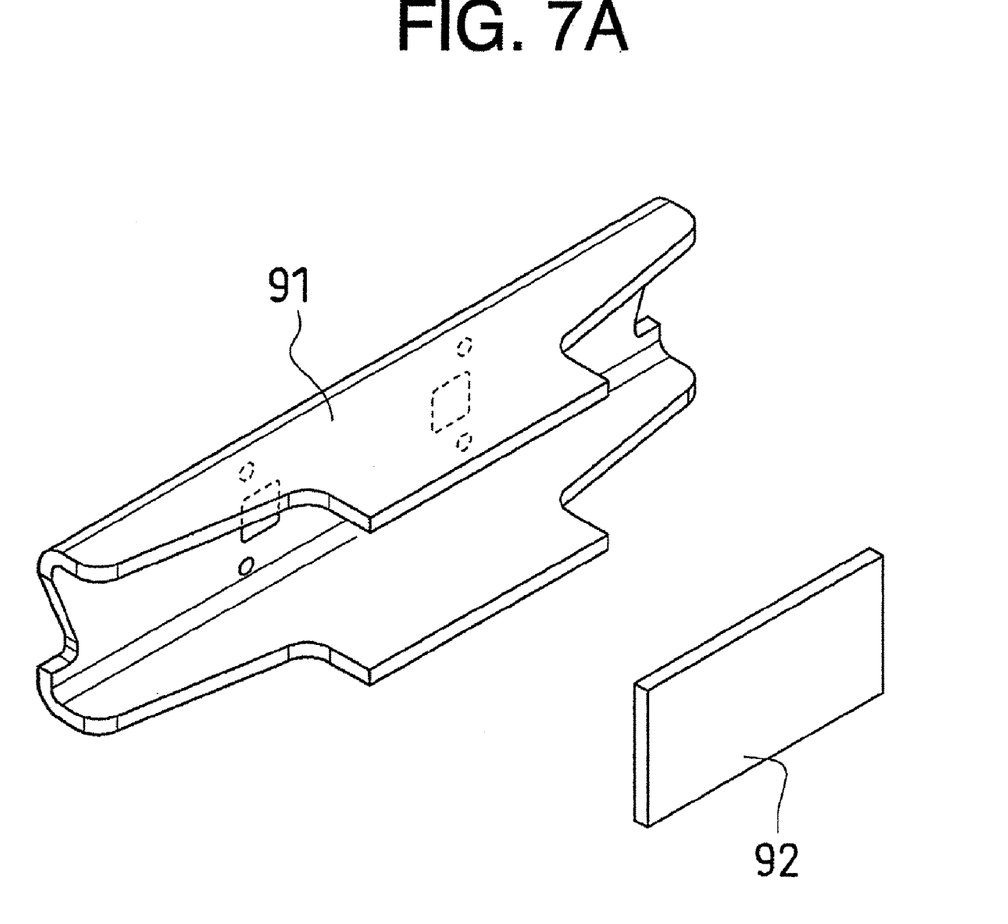
FIG. 7A is a perspective view of the axle beam according to a first alternative embodiment of the present invention.
Figure 7B:
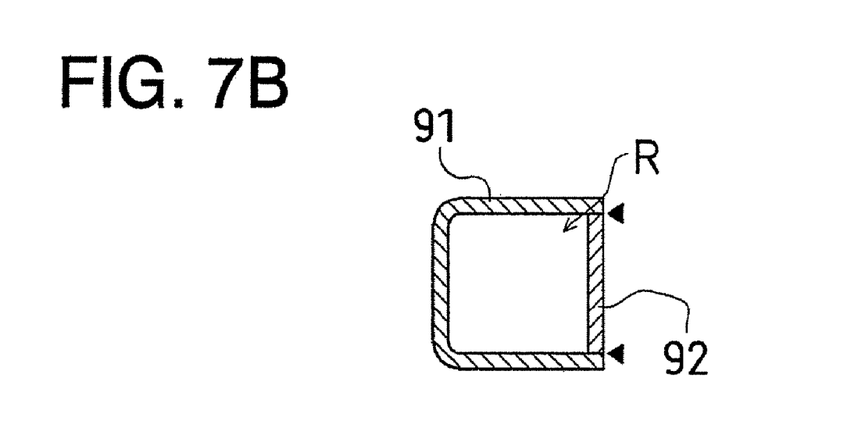
FIG. 7B is a cross-sectional view of a middle portion as seen in the longitudinal direction of the axle beam according to the first alternative embodiment of the present invention.

Referring to FIG. 7A showing a first alternative embodiment, the beam 1 includes a first member 91 having a U-shaped cross-section perpendicular to the longitudinal direction of the beam 1 and a second plate member 92 which is welded to the first member 91. In other words, the beam 1 is formed by two members. The first U-shaped member 91 and the second plate member 92 are welded together in such a way that a space R surrounded by four walls as shown in FIG. 7B which is a cross-sectional view of FIG. 7A is formed in the resulting beam 1. In this case, as shown in FIG. 7B, the resulting beam 1 has two welded portions in the cross-section of the longitudinally middle portion thereof as indicated by two arrows. In this first alternative embodiment, the number of welded portions is two that is fewer than four welded portions of the prior art, so that the yield rate of material and dimensional accuracy are improved.

Figure 8A:
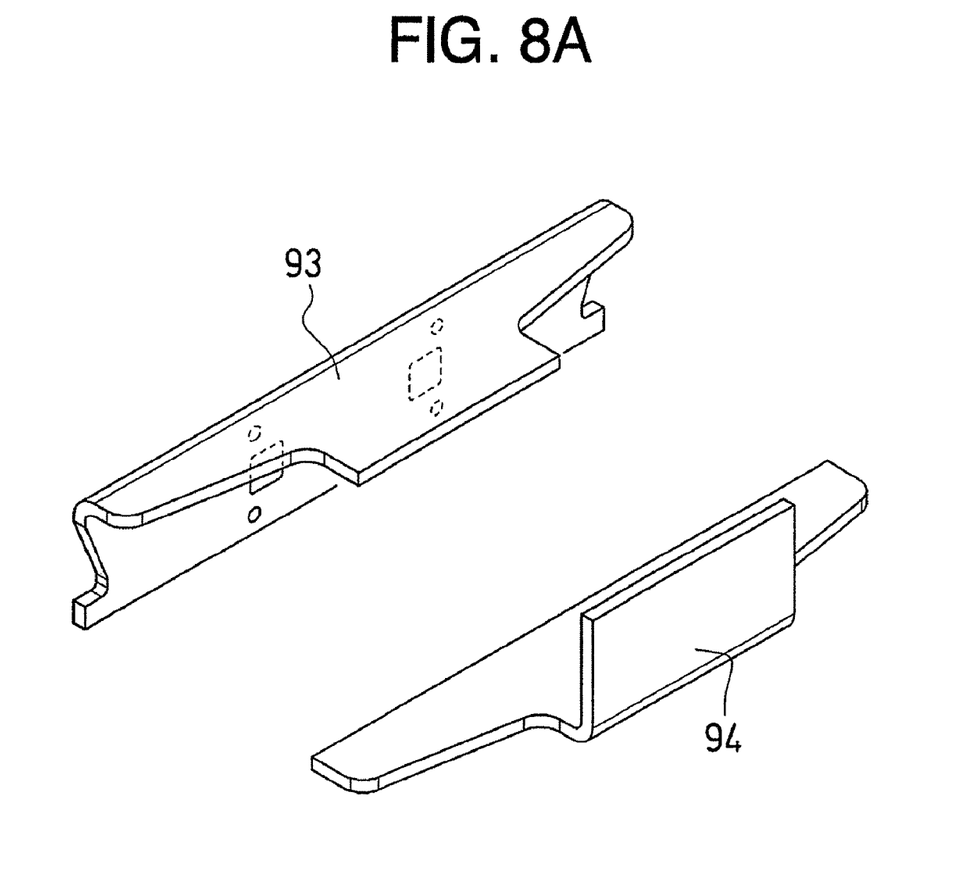
FIG. 8A is a perspective view of the axle beam according to a second alternative embodiment of the present invention.
Figure 8B:
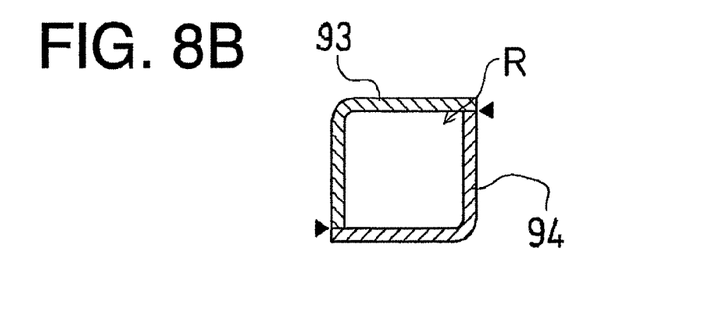
FIG. 8B is a cross-sectional view of a middle portion as seen in the longitudinal direction of the axle beam according to the second alternative embodiment of the present invention.

Referring to FIG. 8A showing a second alternative embodiment, the beam 1 is formed in such a manner that a first member 93 having an L-shaped cross-section perpendicular to the longitudinal direction of the beam 1 is welded to a second member 94 having a similar L-shaped cross-section perpendicular to the longitudinal direction of the beam 1. In other words, the beam 1 is formed by two members. The L-shaped members 93, 94 are welded to each other so as to form a space R at the center of the resulting beam 1 which is surrounded by four walls as shown in FIG. 8B which is a cross-sectional view of FIG. 8A. In this case, as shown in FIG. 8B, there are two welded portions in the cross-section of the longitudinally middle portion of the resulting beam 1. In the second alternative embodiment, the number of welded portions is two that is fewer than four welded portions of the prior art, so that the yield rate of material and dimensional accuracy are improved.

As mentioned above, the number of welded portions is not limited to 0 but may range from 0 to 2 that is fewer than four welded portions of the prior art.

In the preferred embodiment, the present invention has been described by way of a rear axle beam of a forklift truck. As a matter of course, the present invention is also applicable to a front axle beam of a front steering vehicle. In addition, the present invention is not limited to application to a forklift truck, but it is applicable to other types of industrial vehicles.

Therefore, the present examples and embodiments are to be considered as illustrative and not restrictive, and the invention is not to be limited to the details given herein but may be modified within the scope of the appended claims.

What is claimed is:

1. A method of manufacturing an axle beam for an industrial vehicle having a beam and a boss, the beam including a tube portion while being supported on a vehicle body, the boss being connected to opposite ends of the beam in a longitudinal direction of the beam for supporting a kingpin, comprising the steps of:

determining a cutting line for a staggered arrangement of a plurality of identical beams for fusing a tube material, wherein the cutting line is determined in such a manner that the ends of two coadjacent beams are arranged to vertically overlap relative to the longitudinal direction of the tube material; and fusing the tube material so as to produce the plurality of the identical beams from the tube material in a first manufacturing process; and connecting the boss to the beam in a second manufacturing process.

2. The method of manufacturing the axle beam according to claim 1, wherein the first manufacturing process includes:

forming the beam having a closed cross-section perpendicular to a longitudinal direction of the beam only at a longitudinally middle portion thereof so as to form a space which is surrounded by a front and rear and a top and bottom of the beam;

forming an opening at end portions of the beam on a rear side;

forming the beam into a taper-shape towards the ends as seen from a top; and forming cutout portions at opposite ends of a rear portion of the beam in a manner that the beam is recessed in a lateral direction for a predetermined length.

3. The method of manufacturing the axle beam according to claim 1, wherein the first manufacturing process includes fusing the tube material by using a three dimensional plasma fusing apparatus or a three dimensional laser fusing apparatus.

4. The method of manufacturing the axle beam according to claim 1, wherein the first manufacturing step includes utilizing the tube material of a seamless type.

* * * * *